United States Patent

[11] 3,614,752

[72] Inventor Karl-Ulrich Stein
Munich, Germany
[21] Appl. No. 861,338
[22] Filed Sept. 26, 1969
[45] Patented Oct. 19, 1971
[73] Assignee Siemens Aktiengesellschaft
Berlin and Munich, Germany
[32] Priority Oct. 1, 1968
[33] Germany
[31] P 18 00 34.3

[54] STORAGE ARRANGEMENT WITH CONTACT PRESSURE DEVICE
3 Claims, 2 Drawing Figs.

[52] U.S. Cl. .......... 340/173 SP, 235/61.11 J
[51] Int. Cl. .......... G11c 13/00, G11c 19/00
[50] Field of Search .......... 340/173.2, 173 SP

[56] References Cited
UNITED STATES PATENTS
3,118,133 1/1964 Mecker .......... 340/173.2

*Primary Examiner*—Terrell W. Fears
*Attorney*—Hill, Sherman, Meroni, Gross & Simpson

ABSTRACT: An electrical, relatively flat and comparatively thin storage arrangement in which the components are disposed in relatively flat stacked relation one upon the other, having means forming a generally correspondingly shaped chamber in which the stack of components is disposed, the chamber having a wall thereof, bearing on one of the outermost components of the stack, constructed to transmit pressure applied to the external face thereof to said stack whereby the components of the latter may be placed under compression by action of substantially equal pressure forces acting on said wall and the opposite parallel wall of said chamber in opposite directions substantially perpendicular to said first-mentioned wall, means being provided for effecting the application of such pressure with atmospheric or a greater pressure being employed as the pressure-effecting medium.

PATENTED OCT 19 1971 3,614,752

INVENTOR
Karl-Ulrich Stein

BY Hill, Sherman, Meroni, Gross & Simpson ATTYS.

STORAGE ARRANGEMENT WITH CONTACT PRESSURE DEVICE

BACKGROUND OF THE INVENTION

The invention relates to an electrical storage arrangement utilizing components superimposed in stacked arrangement, for example, plates, layers or wires, sheets, and the like, some of which may be constructed in the form of applied layers, in which means is provided for effecting contacting pressure between the respective components, employing a gas as the pressure medium.

Electrical storage arrangements, both nonmagnetic and magnetic are known, magnetic arrangements for example taking the form of magnetic film or magnetic wire storers.

One of the requirements in magnetic storage arrangements of the type mentioned is the close superimposition of the components, especially of the foil conductors on the storage layer proper. Attempts have already been made in the construction of magnetic storage arrangements to apply a pressure force, such as a compressed gas, for example air, on one side of the foil lines and the ferrite yoke, for example on the base plates or wires carrying the magnetic film, in which system the gas is disposed in a closed space extending over the entire storer. Such an arrangement, however, has the great disadvantage that the pressure, being exerted on only the one side, also tend to effect a bending and/or a distortion of the storage arrangement. In this connection it must be kept in mind that the storer proper normally does not consist of merely a single piece but instead a plurality of subassembly plates assembled tightly one upon another, over which the system of the foil conductors or lines extend.

The invention therefore is directed to an arrangement utilizing gas pressure as the pressure medium in which undesired deformation of the storage arrangement is avoided.

BRIEF SUMMARY OF THE INVENTION

The problem is solved according to the invention by an arrangement in which substantially equal pressure forces are so disposed that they will act on the external relatively large substantially parallel surfaces of the storage arrangement in opposition to one another and substantially perpendicular to such surfaces. While in most cases it will be preferable to employ a pressure greater than atmospheric, in some cases it may be advantageous to employ atmospheric pressure as the active medium, which can be readily achieved by having a gastight, relatively elastic sheet extending across the arrangement whereby the space within which the arrangement is disposed may be at least partially evacuated, resulting in the application of atmospheric pressure on such elastic sheet and thereby produce the desired forces. In the event atmospheric pressure is not sufficiently effective, as for example where components of the system, in consequence of the evacuation, lie so completely tightly on upon the other that the contact pressure force, in principle vanishes, it may be advantageous to apply additional pressure on opposite sides of the evacuated space.

An arrangement constructed in accordance with the invention also has the advantage that the pressure forces on each individual surface element of the system is substantially of uniform magnitude, even if such individual components comprising the storage arrangement have somewhat differing dimensions. As experience has disclosed, such fluctuations in dimensions are substantially unavoidable.

Another advantage of an arrangement constructed in accordance with the present invention is that as a result of the substantially complete encapsulation of the storage structure, undesirable local climatic conditions on the system can be avoided, this being particularly true where evacuation is employed.

BRIEF DESCRIPTION OF THE DRAWING

Other objects, features and advantages of the invention will be readily apparent from the following description of certain preferred embodiments thereof, taken in conjunction with the accompanying drawing, (in which like reference characters indicate like or corresponding parts), although variations and modifications may be effected without departing from the spirit and scope of the novel concepts of the disclosure, and in which.

DETAILED DESCRIPTION OF THE INVENTION

Figure 1:
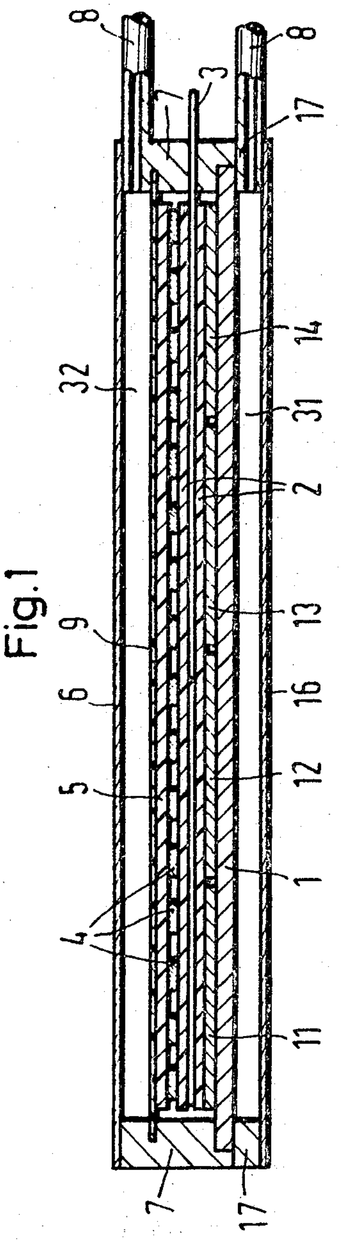
FIG. 1 is a transverse sectional view through a storage arrangement constructed in accordance with the present invention.

Referring to FIG. 1, of the drawing, the reference numeral 1 indicates the base plate of the storage arrangement which carries a plurality of subassembly plates 11, 12, 13, 14 coated with magnetic films. Sheets 2 of insulating material separate the respective series of foil conductors 3 and 4 from one another and from the subassembly plates. Superimposed upon the conductors is a ferrite yoke 5 which completes the magnetic circuit. A plate member 6 and edge members 7, together with the plate 1, form an enclosure for the storage arrangement, which enclosure is provided with a gas inlet 8 for supplying the gas forming the pressure medium. Disposed across the upper face of the storage arrangement is an elastic cover sheet 9, securing a gastight closure together with the edge members 7 and member 6, formed from a material which is impermeable to the gas employed. Such material, for example, may be a plastic such as that sold under the trade name "-Mylar". The opposite side of the storage arrangement, is provided with a closure comprising a plate member 16 and edge members 17, corresponding to the plate member 6 and edge members 7, and likewise is provided with a gas inlet connection 8 by means of which gas may be supplied to the adjacent face of the plate 1. In this construction the spaces 31 and 32 formed by the respective closure structures may be filled with a gas at a pressure greater than atmospheric. Expediently, the spaces 31 and 32 may be interconnected for the passage of gas therebetween.

It will be appreciated that the pressure forces acting upon the storage arrangement are balanced at opposite sides thereof and that any minor bending taking place in the closure plates 6 or 16 is immaterial.

Figure 2:
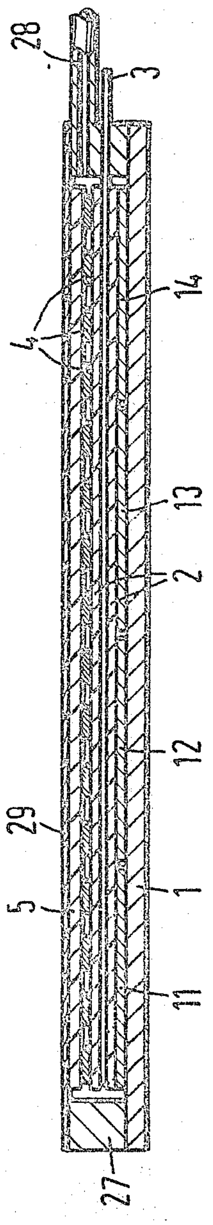
FIG. 2 is a similar sectional view of a modified form of the invention.

The construction illustrated in FIG. 2 is similar to that shown in FIG. 1 and includes the respective parts 2, 3, 4, 5, 11, 12, 13 and 14 of the construction illustrated in FIG. 1 with the base plate 1, edge members 27 generally corresponding to the members 7, and an elastic sheet 29 generally corresponding to the sheet 9, forming an enclosure for the rest of the storage components. Communicating with the interior of such enclosure is a pipe connection 28 which may be connected to a suitable evacuation mechanism whereby the interior of such enclosure may be evacuated. It will be apparent that upon evacuation of the interior of such enclosure the elastic sheet 29, likewise preferably of "Mylar", will closely engage the ferrite yoke under the action of atmospheric pressure at the exterior surface of such sheet and if any airspaces, not filled by solid matter, initially existed in the enclosure formed by the members 1, 27 and 29, upon evacuation pressure forces are exerted which act to eliminate such airspaces, as a result of which a very effective contact of the foil conductors with the magnetic layers is effected as well as a good contact with respect to a ferrite yoke, if such is employed.

In accordance with another feature of the invention it is possible to combine features of the constructions illustrated in FIGS. 1 and 2, as previously described, whereby the enclosure containing the storage arrangement may be evacuated and a pressure greater than atmospheric pressure applied to both sides of such enclosure. This may be readily accomplished with the structure of FIG. 1 by the provision of an evacuation port, as for example by means of a pipe 28' which may be connected to a vacuum pump or the like to effect evacuation of the enclosure defined by the plate 1, sheet 9 and edge members 7. This arrangement presents the further advantage that an active pressure force is applied at the various places where there is already achieved a smooth contacting of the adjacent components.

It will be particularly noted from the above description that in all forms illustrated there is achieved a balanced or equalized application of pressure to the storage arrangement whereby there is a complete elimination of any forces tending to exert undesirable bending forces on the magnetic structure. Likewise, it will be apparent that the present invention provides a construction which is extremely simple and yet relatively rugged in construction.

I claim as my invention:

1. An electrical, relatively flat and comparatively thin storage arrangement in which the components are disposed in relatively flat-stacked relation, one upon the other, comprising means forming a generally correspondingly shaped chamber in which said stack of components is disposed, said chamber having a wall thereof, bearing on one of the outermost components of said stack, constructed to transmit pressure applied to the external face thereof to said stack whereby the components of the latter may be placed under compression by action of substantially equal pressure forces acting on said wall and the opposite wall of said chamber in opposite direction substantially perpendicular to said walls, and means cooperable with said chamber forming means for effecting the application of such pressure forces, said pressure effecting means being constructed to conduct a gas under pressure greater than atmospheric pressure to the exterior of said oppositely disposed walls.

2. An arrangement according to claim 1, wherein said pressure effecting means is constructed to enable at least a partial evacuation of said chamber and to conduct a gas under pressure greater than atmospheric to the exterior of said walls.

3. An arrangement according to claim 1, wherein said pressure effecting means is constructed to effect at least a partial evacuation of said chamber whereby said pressure forces are derived from the action of atmospheric pressure.